(12) United States Patent
Kolesnikov (10) Patent No.: US 8,891,766 B2
(45) Date of Patent: Nov. 18, 2014

(54) INPUT CONSISTENCY VERIFICATION FOR TWO-PARTY SECURE FUNCTION EVALUATION

(71) Applicant: Vladimir Y. Kolesnikov, Jersey City, NJ (US)

(72) Inventor: Vladimir Y. Kolesnikov, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 78 days.

(21) Appl. No.: 13/630,568

(22) Filed: Sep. 28, 2012

(65) Prior Publication Data

US 2014/0105393 A1   Apr. 17, 2014

(51) Int. Cl.
*H04L 29/06* (2006.01)
*H04L 9/28* (2006.01)
*H04L 9/32* (2006.01)

(52) U.S. Cl.
CPC .............. *H04L 9/28* (2013.01); *H04L 2209/46* (2013.01); *H04L 2209/50* (2013.01); *H04L 9/3218* (2013.01)
USPC ........... 380/255; 713/150; 713/168; 713/169; 713/174

(58) Field of Classification Search
CPC ...... H04L 9/28; H04L 9/3218; H04L 2209/50
USPC .......................................................... 380/255
See application file for complete search history.

(56) References Cited

U.S. PATENT DOCUMENTS

| 7,240,198 | B1* | 7/2007 | Pinkas et al. ................. 713/168 |
| 2001/0053220 | A1* | 12/2001 | Kocher et al. .................. 380/29 |
| 2007/0156796 | A1* | 7/2007 | Furukawa et al. ............ 708/200 |
| 2011/0211692 | A1* | 9/2011 | Raykova et al. ................ 380/46 |
| 2012/0070000 | A1* | 3/2012 | Baechler et al. .............. 380/255 |
| 2012/0213359 | A1* | 8/2012 | Troncoso Pastoriza et al. ............................... 380/28 |
| 2012/0233460 | A1* | 9/2012 | Kamara et al. ................ 713/168 |

OTHER PUBLICATIONS

Järvinen et al., Embedded SFE: Offloading Server and Network Using Hardware Tokens, Jan. 2010, Financial Cryptography and Data Security, vol. 6052, pp. 207-221.*

(Continued)

*Primary Examiner* — Mohammad L Rahman
*Assistant Examiner* — Kenneth Chang
(74) *Attorney, Agent, or Firm* — Ryan, Mason & Lewis, LLP (57) ABSTRACT

Secure function evaluation SFE) with input consistency verification is performed by two parties to evaluate a function. For each execution, the first party computes a garbled circuit corresponding to the function and uses an Oblivious Transfer protocol to provide wire secrets that are an encrypted version $k_i$ of the input $x_i$ of the second party. The second party stores the encrypted version $k_i$ of the input $x_i$ of the second party for the plurality of executions. The second party receives the garbled circuit for computation of an output, which is sent to the first party. To verify the inputs of the second party for two executions, the first party computes a check garbled circuit corresponding to a verification function based on the input keys of the garbled circuits being verified; and sends the check garbled circuit to the second party for computation of a verification output. The verification output is computed by applying the stored encrypted versions $k_i$ for the two executions to the check garbled circuit. The verification output is evaluated to verify the inputs $x_i$ of the second party for the two executions.

10 Claims, 4 Drawing Sheets

(56) References Cited

OTHER PUBLICATIONS

Järvinen et al., Garbled Circuits for Leakage-Resilience: Hardware Implementation and Evaluation of One-Time Programs, Aug. 2010, CHES 2010 Lecture Notes in Computer Science, vol. 6225, pp. 383-397.*

Huang et al., Faster Secure Two-Party Computation Using Garbled Circuits, Aug. 2011, USENIX Security Symposium, vol. 201, No. 1, pp. 1-16.*

Yehuda et al., "An Efficient Protocol for Secure Two-Party Computation in the Presence of Malicious Adversaries", International Association for Cryptologic Research, vol. 20080130:161356, pp. 1-36 (Jan. 30, 2008).

Yehuda et al., "A Proof of Yao's Protocol for Secure Two-Party Computation", International Association for Cryptologic Research, vol. 20110111:080015, pp. 1-25 (Jan. 11, 2011).

Yao, Andrew C., "How to Generate and Exchange Secrets", Annual Symposium on Foundations of Computer Science, Toronto, vol. SYMP. 27, pp. 162-167 (Oct. 27, 1986).

Yao, Andrew C., "Protocols for Secure Computations", Annual Symposium on Foundations of Computer Science, pp. 160-164 (Jan. 1, 1982).

Ishai et al., "Extending Oblivious Transfers Efficiently", In: Field Programmable Logic and Application,Berlin, Heidelberg vol. 2729, pp. 145-161 (Jan. 1, 2003).

Harnik et al., "OT-Combiners via Secure Computation", Theory of Cryptography; [Lecture notes in Computer Science] Springer Berlin Heidelberg, pp. 393-411 (Mar. 19, 2008).

* cited by examiner

FIG. 4

INPUT CONSISTENCY VERIFICATION FOR TWO-PARTY SECURE FUNCTION EVALUATION

STATEMENT OF GOVERNMENT RIGHTS

The present invention was made in connection with work performed under the Intelligence Advanced Research Projects Activity (IARPA) via Department of the Interior (DOI) Contract No. D11PC20194.

FIELD OF THE INVENTION

The present invention relates generally to techniques for securing electronic transactions and, more particularly, to secure function evaluation (SFE) techniques that provide privacy to the parties of such electronic transactions.

BACKGROUND OF THE INVENTION

Two-party general secure function evaluation (SFE) allows two parties to evaluate any function on their respective inputs x and y, while maintaining the privacy of both x and y. Efficient SFE algorithms enable a variety of electronic transactions, previously impossible due to mutual mistrust of participants. For example, SFE algorithms have been employed in auctions, contract signing and distributed database mining applications. The problem of secure computation has been solved for both semi-honest and malicious players. Generally, having access to a semi-honest server resolves the problem of malicious circuit generation. As computation and communication resources have increased, SFE has become truly practical for common use. A malicious SFE model provides a guarantee of complete privacy of the players' inputs. Existing generic two-party SFE algorithms typically employ Garbled Circuits (GCs). For a detailed discussion of GCs, see, for example, Y. Lindell and B. Pinkas, "A Proof of Yao's Protocol for Secure Two-Party Computation," Journal of Cryptology, 22 (2):161-188 (2009).

Under a Garbled Circuit implementation, a Boolean circuit representing the computed function is encrypted by a first party and is given to a second party for evaluation. The evaluation proceeds under encryption, and hence the second party cannot deviate from the protocol. While such existing generic two-party SFE algorithms based on Garbled Circuits have significantly improved the privacy and security of two party transactions, a number of limitations remain, which, if overcome, could further improve the efficiency, utility and/or security of generic two-party SFE algorithms. For example, in the case of multiple SFE executions between the same parties, there is a need for verifying input consistency between executions. The second party, however, can perform an attack by substituting his or her prior input (i.e., replacing the real input with a different value that is to his or her advantage).

A need therefore exists for techniques for ensuring input consistency of the malicious players across multiple executions. A further need exists for techniques for ensuring input consistency that allow a party to prove he or she is using the same or related input (as agreed among the parties) to what was used in a prior execution.

SUMMARY OF THE INVENTION

Generally, methods and apparatus are provided for input consistency verification for two-party secure function evaluation. According to one aspect of the invention, two-party secure function evaluation (SFE) is performed by a first party to evaluate a function for a plurality of executions i with a second party. For a plurality of the executions i: the first party computes a garbled circuit $GC_i$ corresponding to the function; communicates with the second party using an Oblivious Transfer (OT) protocol to provide wire secrets that are an encrypted version $k_i$ of the input $x_i$ of the second party, wherein the second party stores the encrypted version $k_i$ of the input $x_i$ of the second party for the plurality of executions; sends the computed garbled circuit $GC_i$ to the second party for computation of an output; receives the output from the second party. For a subsequent verification of the inputs $x_i$ of the second party for two of the executions, the first party computes a check garbled circuit CGC corresponding to a verification function based on the input keys of the garbled circuits being verified; sends the computed check garbled circuit CGC to the second party for computation of a verification output, wherein the second party computes the verification output by applying the stored encrypted versions $k_i$ for the two executions; receives the verification output from the second party; and evaluates the verification output to verify the inputs $x_i$ of the second party for the two executions.

According to another aspect of the invention, two-party secure function evaluation (SFE) is performed by the second party to evaluate a function for a plurality of executions i with the first party. For a plurality of the executions i, the second party receives a garbled circuit $GC_i$ corresponding to the function from the first party; communicates with the first party using an Oblivious Transfer (OT) protocol to receive wire secrets that are an encrypted version $k_i$ of the input $x_i$ of the second party; stores the encrypted version $k_i$ of the input $x_i$ of the second party for the plurality of executions; applies inputs to the computed garbled circuit $GC_i$ to compute an output; and provides the output to the first party. For a subsequent verification by the first party of the inputs $x_i$ of the second party for two of the executions, the second party receives a check garbled circuit CGC corresponding to a verification function from the first party; computes a verification output by applying the stored encrypted versions $k_i$ for the two executions to the check garbled circuit CGC; and provides the verification output to the first party for verification that the inputs $x_i$ of the second party for the two executions.

The verification function, for example, comprises one or more of an equality function, a greater than function, a less than function and a verification function agreed upon by both parties.

A more complete understanding of the present invention, as well as further features and advantages of the present invention, will be obtained by reference to the following detailed description and drawings.

DETAILED DESCRIPTION

Aspects of the present invention provide methods and apparatus for ensuring input consistency of at least one party of a secure function evaluation across multiple executions. Consider, for example, an online banking dating application, where a a first party P1 (the server) and a second party P2 (e.g., a customer or client) exchange information using a secure function evaluation across multiple executions. Once a certain input has been used by the second party P2 in communication with the first party P1, the first party P1 can always ask the second party P2 to supply the same input (or, e.g., an increasing input) in future communication. The first party P1 can verify that, for two SFE evaluations, a particular input wire of the second party P2 is set to the same plaintext value (or a greater value).

Figure 1:
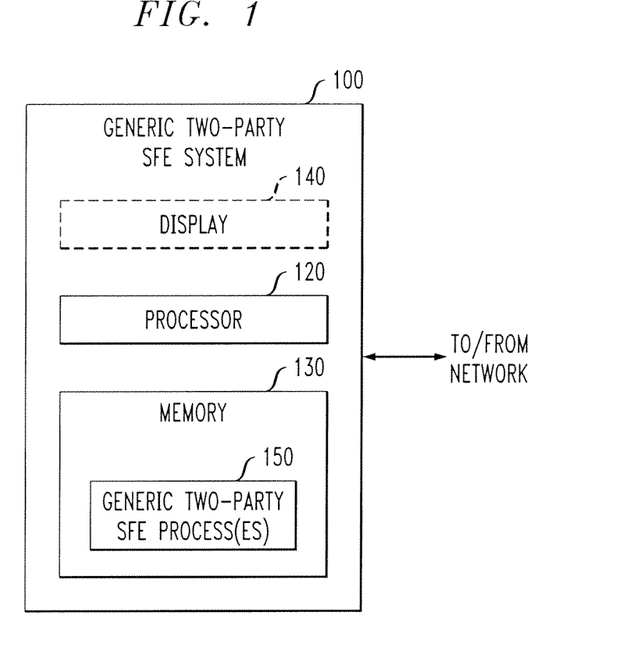
FIG. 1 is a block diagram of an improved generic two-party SFE system that can implement the processes of the present invention.

FIG. 1 is a block diagram of an improved generic two-party SFE system 100 that can implement the processes of the present invention. As shown in FIG. 1, memory 130 configures the processor 120 to implement the generic two-party SFE methods, steps, and functions disclosed herein (collectively, shown as 150 in FIG. 1, and discussed further below in conjunction with FIGS. 2 through 4). The memory 130 could be distributed or local, and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into a personal computer, laptop computer, handheld computing device, application-specific circuit or general-use integrated circuit.

Generic Two-Party SFE Algorithms

Existing generic two-party SFE algorithms typically employ Garbled Circuits (GCs). For a detailed discussion of GCs, see, for example, Andrew C. Yao, "Protocols for Secure Computations," Proc. 23rd IEEE Symp. on Foundations of Comp. Science, 160-164, (Chicago, 1982); or Andrew C. Yao," "How to Generate and Exchange Secrets," Proc. 27th IEEE Symp. on Foundations of Comp. Science, 162-167 (Toronto, 1986).

GC is secure against malicious circuit evaluator and semi-honest circuit constructor, therefore we will have the semi-honest server S generate the garbled circuit for the chosen function (as communicated to S by both clients). As for inputs, OT extension is used secure against malicious receivers and semi-honest server. See, e.g., D. Harnik et al., "OT-Combiners via Secure Computation," TCC $5^{th}$ Theory of Cryptography Conference 2008 (March 2008), Lecture Notes in Computer Science, Vol. 4948, 393-411 (2008); and/or Y. Ishai et al., "Extending Oblivious Transfers Efficiently," Advances in Cryptology—CRYPTO 2003 (August 2003), Lecture Notes in Computer Science, Vol. 2729, 145-161 (2003).

Figure 2:
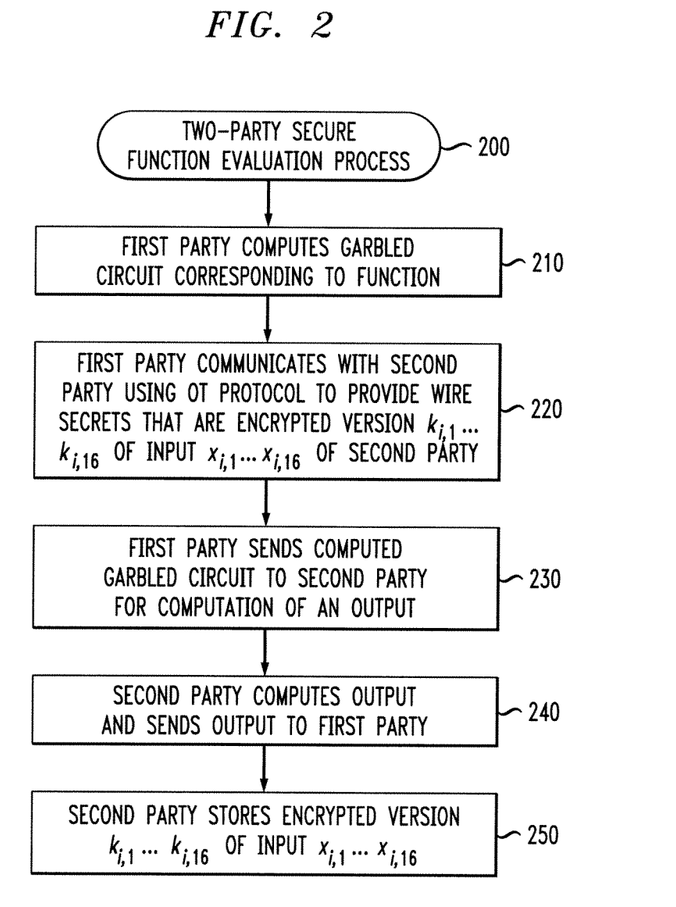
FIG. 2 is a flow chart describing an exemplary implementation of a two-party secure function evaluation process incorporating aspects of the present invention.

FIG. 2 is a flow chart describing an exemplary implementation of a two-party secure function evaluation process 200 incorporating aspects of the present invention. The two-party secure function evaluation process 200 is performed by a first party P1 (the server) and a second party P2 (e.g., a customer or client) to evaluate a function for a given execution i and for an exemplary 16 bit input. As shown in FIG. 2, the first party P1 initially computes a garbled circuit during step 210 corresponding to the function. Thereafter, the first party P1 communicates with the second party P2 during step 220 using an Oblivious Transfer (OT) protocol to provide wire secrets that are an encrypted version $k_{i,1} \ldots k_{i,16}$ of the input $x_{i,1} \ldots x_{i,16}$ of the second party P2, for a given execution i and for an exemplary 16 bit input, such that the first party P1 cannot learn the input $x_{i,1} \ldots x_{i,16}$ of the second party P2.

The first party P1 then sends the computed garbled circuit to the second party P2 during step 230 for computation of an output. The second party P2 then computes the output during step 240 and sends the output to the first party P1. The second party stores the encrypted version $k_{i,1} \ldots k_{i,16}$ of the input $x_{i,1} \ldots x_{i,16}$ of the second party P2 during step 250.

In this manner, each time that Parties 1 and 2 wish to engage in the next stage of their joint computation, Party 1 (the server) will generate the GC for the computed function and send to Party 2 (client) for evaluation in accordance with the two-party secure function evaluation process 200 of FIG. 2.

As indicated above, the exemplary two-party secure function evaluation process 200 requires Party 2 to store the input wire encryptions $k_{i,1} \ldots k_{i,16}$ among the executions i where input consistency will be enforced. Whenever Party 1 desires to check input consistency, Party 1 will generate a check garbled circuit, as discussed further below in conjunction with FIG. 3, where the GC inputs are encrypted with the same encryptions as in the executions being checked.

This check can be done in a probabilistic manner, as rarely or as frequently as desired by Player 1. That is, the first party P1 may select at will when and which executions he or she is checking. A failed check will imply that the second P2 is cheating and should cause punitive action. Further, the first party P1 may select arbitrary executions from the past for the check, hence the second party P2 will not know whether or not he or she "got away" with his cheating.

The second party P2 will not be able to lie about the result of the check, since the second party P2 operates under encryption and cannot deviate from GC evaluation. The first party P1 will not learn anything additional other than the result of the input consistency check because of the properties of GC evaluation.

Figure 3:
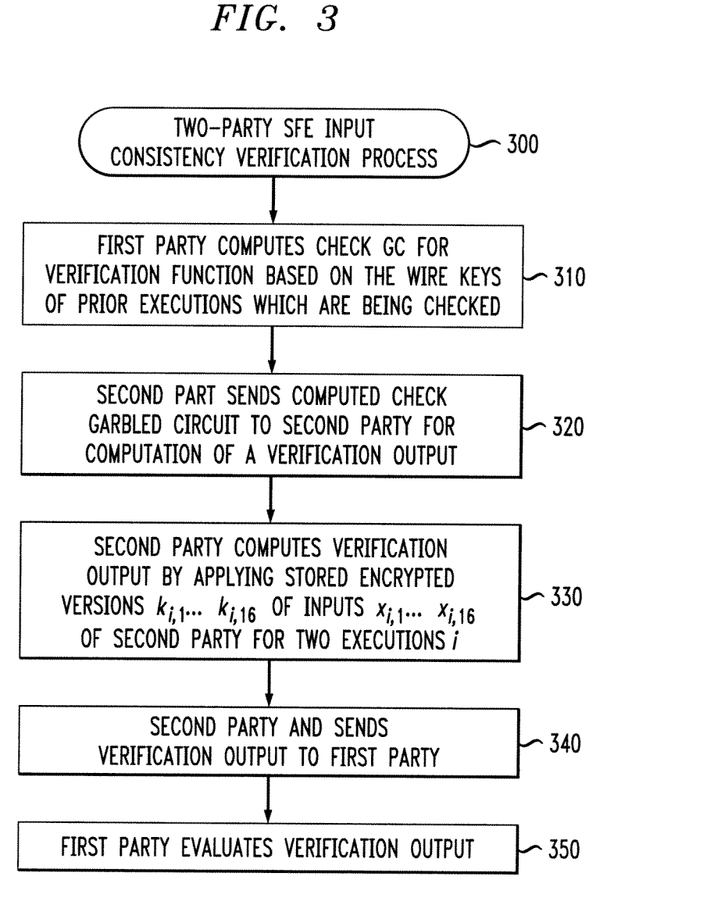
FIG. 3 is a flow chart describing an exemplary implementation of a two-party SFE input consistency verification process incorporating aspects of the present invention.

FIG. 3 is a flow chart describing an exemplary implementation of a two-party SFE input consistency verification process 300 incorporating aspects of the present invention. The two-party SFE input consistency verification process 300 is initiated by the first party P1 (the server) when the first party P1 desires to perform an input consistency verification of the second party P2 (e.g., a customer or client) for a given pair of executions i and for an exemplary 16 bit input. For example, the inputs of the second party P2 can be 16-bit integers, and the first party P1 wants to ensure that the second input of the second party P2 is greater than (or equal to) the first input of the second party P2.

As shown in FIG. 3, the first party P1 computes a check GC during step 310 for the desired verification function (e.g., equality function or a greater/lesser than function). The first party P1 sends the computed check GC to the second party P2 for computation of a verification output during step 320. The computed check GC is computed with respect to the input wire keys that were used to generated the GCs being checked. In particular, the input keys to check GC will be exactly the input keys that S had generated for P2 in the executions being checked.

The second party P2 computes the verification output during step 330 by applying the previously stored encrypted versions $k_{i,1} \ldots k_{i,16}$ of the inputs $x_{i,1} \ldots x_{i,16}$ of the second party for the two executions i requested by the first party P1. The second party P2 sends the computed verification output to the first party P1 during step 340. The first party then evaluates the verification output during step 350.

Figure 4:
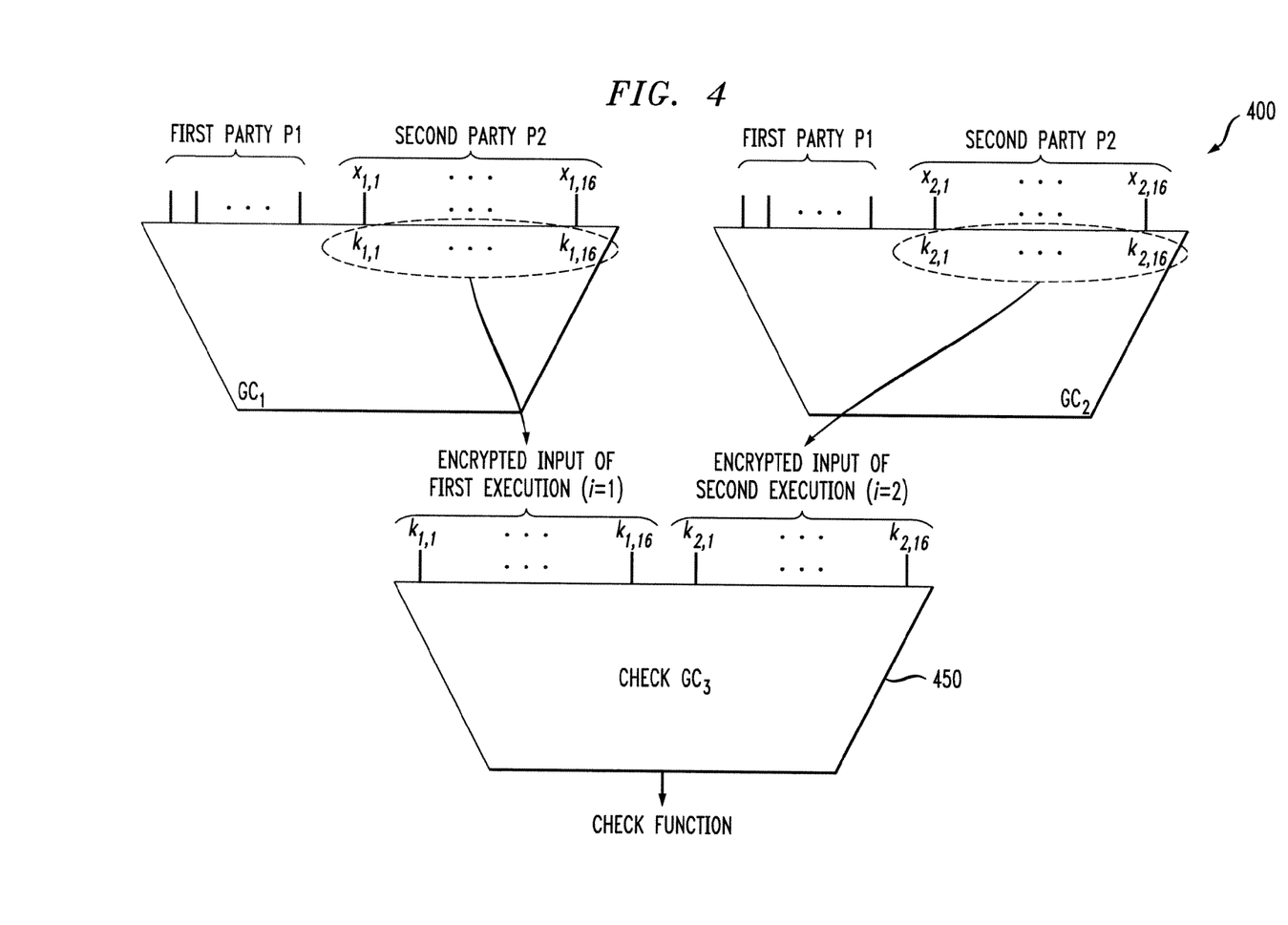
FIG. 4 illustrates an input consistency verification in accordance with aspects of the present invention for a given pair of executions.

FIG. 4 illustrates an input consistency verification 400 in accordance with aspects of the present invention for a given pair of executions i=1 and i=2. As discussed above in conjunction with FIG. 2, the first party P1 generates a Garbled Circuit for each execution. As shown in FIG. 4, the first party P1 generates a Garbled Circuit GC1 for a first execution and a Garbled Circuit GC2 for a second execution (which are not necessarily consecutive) and for each execution, the first party P1 send the generated Garbled Circuit to the second party for computation of an output. The parties exchange their inputs using oblivious transfer, such that the second party obtains an encrypted version $k_{i,1} \ldots k_{i,16}$ of the input $x_{i,1} \ldots x_{i,16}$ of the second party P2, for a given execution i and for an exemplary 16 bit input. Thus, for the first execution (i=1), the second party P2 obtains an encrypted version $k_{1,1} \ldots k_{1,16}$ of its execution input, and for the second execution (i=2), the second party P2 obtains an encrypted version $k_{2,1} \ldots k_{2,16}$ of its execution input.

In accordance with the exemplary two-party secure function evaluation process 200, the second party P2 applies its input $x_{i,1} \ldots x_{1,16}$ to the garbled circuit for the given execution, and stores the encrypted version $k_{i,1} \ldots k_{i,16}$ of its input for later possible verification with the first party.

As discussed above in conjunction with FIG. 3, the two-party SFE input consistency verification process 300 is initiated by the first party P1 (the server) when the first party P1 desires to perform an input consistency verification of the second party P2 (e.g., a customer or client) for a given pair of executions i and for an exemplary 16 bit input. For example, say there are two executions where the inputs of the second party P2 need to be related by a verification function.

For example, the inputs of the second party P2 can be 16-bit integers, and the first party P1 wants to ensure that the second input of the second party P2 is greater than (or equal to) the first input of the second party P2. Assume that the first input of the second party P2 is $x_{1,1} \ldots x_{1,16}$ and the second input of the second party P2 is second is $x_{2,1} \ldots x_{2,16}$. As indicated above, as part of each of the GC-based executions 1 and 2 in accordance with the two-party secure function evaluation process 200, the first party P1 will generate encryptions of each of the two values (0 and 1) of each of the input bits of the second party P2, and the second party P2 will obtain the encryptions corresponding to his inputs (in total P2 will receive 2×16 encryptions corresponding to his two 16-bit inputs). Now, if the first party P1 wants to check that P2 submitted his or her inputs correctly, the first party P1 will generate a check circuit $GC_3$ 450, which will take the 32 encrypted input bits (k values) and compute the check function on these inputs. In the exemplary embodiment, the check circuit $GC_3$ 450 will implement the check that x2 is greater than x1. The encrypted output of the check function $GC_3$ 450 is computed by the second party P2 during step 340 (FIG. 3) and is sent back to the first party P1 for encryption and verification during step 350 (FIG. 3).

System and Article of Manufacture Details

While FIGS. 2 and 3 show an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for two-party secure function evaluation (SFE) performed by a first party to evaluate a function for a plurality of executions i with a second party, comprising:

for a plurality of said executions i:

computing a garbled circuit $GC_i$ corresponding to said function;

communicating with said second party using an Oblivious Transfer (OT) protocol to provide wire secrets that are an encrypted version $k_i$ of the input $x_i$ of said second party, wherein the second party stores said encrypted version $k_i$ of the input $x_i$ of said second party for said plurality of executions;

sending the computed garbled circuit $GC_i$ to said second party for computation of an output; and receiving said output from said second party; and for a subsequent verification of said inputs $x_i$ of said second party for two of said executions:

computing a check garbled circuit CGC corresponding to a verification function based on the input keys of the garbled circuits being verified, wherein said verification function comprises one or more of an equality function, a greater than function, a less than function and a verification function agreed upon by both parties;

sending the computed check garbled circuit CGC to said second party for computation of a verification output, wherein said second party computes said verification output by applying said stored encrypted versions $k_i$ for said two executions to said check garbled circuit CGC;

receiving said verification output from said second party; and evaluating said verification output to verify said inputs $x_i$ of said second party for said two executions.

2. The method of claim 1, wherein said first party comprises a server and said second party comprises a client.

3. A non-transitory machine-readable recordable storage medium for two-party secure function evaluation (SFE) performed by a first party to evaluate a function for a plurality of executions i with a second party, wherein one or more software programs when executed by one or more processing devices implement the following steps:

for a plurality of said executions i:

computing a garbled circuit $GC_i$ corresponding to said function;

communicating with said second party using an Oblivious Transfer (OT) protocol to provide wire secrets that are an encrypted version $k_i$ of the input $x_i$ of said second party, wherein the second party stores said encrypted version $k_i$ of the input $x_i$ of said second party for said plurality of executions;

sending the computed garbled circuit $GC_i$ to said second party for computation of an output; and receiving said output from said second party; and for a subsequent verification of said inputs $x_i$ of said second party for two of said executions:

computing a check garbled circuit CGC corresponding to a verification function based on the input keys of the garbled circuits being verified, wherein said verification function comprises one or more of an equality function, a greater than function, a less than function and a verification function agreed upon by both parties;

sending the computed check garbled circuit CGC to said second party for computation of a verification output, wherein said second party computes said verification output by applying said stored encrypted versions $k_i$ for said two executions to said check garbled circuit CGC;

receiving said verification output from said second party; and evaluating said verification output to verify said inputs $x_i$ of said second party for said two executions.

4. A method for two-party secure function evaluation (SFE) performed by a second party to evaluate a function for a plurality of executions i with a first party, comprising:

for a plurality of said executions i:

receiving a garbled circuit $GC_i$ corresponding to said function from said first party;

communicating with said first party using an Oblivious Transfer (OT) protocol to receive wire secrets that are an encrypted version $k_i$ of the input $x_i$ of said second party;

storing said encrypted version $k_i$ of the input $x_i$ of said second party for said plurality of executions;

applying inputs to the computed garbled circuit $GC_i$ to compute an output; and providing said output to said first party; and for a subsequent verification by said first party of said inputs $x_i$ of said second party for two of said executions:

receiving a check garbled circuit CGC corresponding to a verification function from said first party, wherein said verification function comprises one or more of an equality function, a greater than function, a less than function and a verification function agreed upon by both parties;

computing a verification output by applying said stored encrypted versions $k_i$ for said two executions to the check garbled circuit CGC; and providing said verification output to said first party for verification that said inputs $x_i$ of said second party for said two executions.

5. The method of claim 4, wherein said first party comprises a server and said second party comprises a client.

6. A non-transitory machine-readable recordable storage medium for two-party secure function evaluation (SFE) performed by a second party to evaluate a function for a plurality of executions i with a first party, wherein one or more software programs when executed by one or more processing devices implement the following steps:

for a plurality of said executions i:

receiving a garbled circuit $GC_i$ corresponding to said function from said first party;

communicating with said first party using an Oblivious Transfer (OT) protocol to receive wire secrets that are an encrypted version $k_i$ of the input $x_i$ of said second party;

storing said encrypted version $k_i$ of the input $x_i$ of said second party for said plurality of executions;

applying inputs to the computed garbled circuit $GC_i$ to compute an output; and providing said output to said first party; and for a subsequent verification by said first party of said inputs $x_i$ of said second party for two of said executions:

receiving a check garbled circuit CGC corresponding to a verification function from said first party, wherein said verification function comprises one or more of an equality function, a greater than function, a less than function and a verification function agreed upon by both parties;

computing a verification output by applying said stored encrypted versions $k_i$ for said two executions to the check garbled circuit CGC; and providing said verification output to said first party for verification that said inputs $x_i$ of said second party for said two executions.

7. A system for two-party secure function evaluation (SFE) by a first party to evaluate a function for a plurality of executions i with a second party, comprising:

a memory; and at least one hardware device, coupled to the memory, operative to:

for a plurality of said executions i:

compute a garbled circuit $GC_i$ corresponding to said function;

communicate with said second party using an Oblivious Transfer (OT) protocol to provide wire secrets that are an encrypted version $k_i$ of the input $x_i$ of said second party, wherein the second party stores said encrypted version $k_i$ of the input $x_i$ of said second party for said plurality of executions;

send the computed garbled circuit $GC_i$ to said second party for computation of an output; and receive said output from said second party; and for a subsequent verification of said inputs $x_i$ of said second party for two of said executions:

compute a check garbled circuit CGC corresponding to a verification function based on the input keys of the garbled circuits being verified, wherein said verification function comprises one or more of an equality function, a greater than function, a less than function and a verification function agreed upon by both parties;

send the computed check garbled circuit CGC to said second party for computation of a verification output, wherein said second party computes said verification output by applying said stored encrypted versions $k_i$ for said two executions to said check garbled circuit CGC;

receive said verification output from said second party; and evaluate said verification output to verify said inputs $x_i$ of said second party for said two executions.

8. The system of claim 7, wherein said first party comprises a server and said second party comprises a client.

9. A system for two-party secure function evaluation (SFE) performed by a second party to evaluate a function for a plurality of executions i with a first party, comprising:

a memory; and at least one hardware device, coupled to the memory, operative to:

for a plurality of said executions i:

receive a garbled circuit $GC_i$ corresponding to said function from said first party;

communicate with said first party using an Oblivious Transfer (OT) protocol to receive wire secrets that are an encrypted version $k_i$ of the input $x_i$ of said second party;

store said encrypted version $k_i$ of the input $x_i$ of said second party for said plurality of executions;

apply inputs to the computed garbled circuit $GC_i$ to compute an output; and provide said output to said first party; and for a subsequent verification by said first party of said inputs $x_i$ of said second party for two of said executions:

receive a check garbled circuit CGC corresponding to a verification function from said first party, wherein said verification function comprises one or more of an equality function, a greater than function, a less than function and a verification function agreed upon by both parties;

compute a verification output by applying said stored encrypted versions $k_i$ for said two executions to the check garbled circuit CGC; and provide said verification output to said first party for verification that said inputs $x_i$ of said second party for said two executions.

10. The system of claim 9, wherein said first party comprises a server and said second party comprises a client.

* * * * *

UNITED STATES PATENT AND TRADEMARK OFFICE
CERTIFICATE OF CORRECTION

| | | |
|---|---|---|
| PATENT NO. | : 8,891,766 B2 | Page 1 of 1 |
| APPLICATION NO. | : 13/630568 | |
| DATED | : November 18, 2014 | |
| INVENTOR(S) | : Vladimir Y. Kolesnikov | |

It is certified that error appears in the above-identified patent and that said Letters Patent is hereby corrected as shown below:

On the title page item 57

In the Abstract, line 1, replace "Secure function evaluation SFE)" with --Secure function evaluation (SFE)--.

In the drawings

Sheet 3, FIG. 3, block 320, line 1, replace "SECOND PART" with --FIRST PARTY--.

Sheet 3, FIG. 3, block 340, line 1, remove "AND" after "PARTY" and before "SENDS.".

In the specification

In column 1, line 42, replace "party and is given" with --party, and is given--.

In column 2, line 3, replace "executions i: the first party" with --executions i:, the first party--.

In column 3, line 7, remove "a" after "where a" and before "first party.".

In column 5, line 9, replace "P1 send the generated" with --P1 sends the generated--.

Signed and Sealed this
Twenty-second Day of March, 2016

Michelle K. Lee
*Director of the United States Patent and Trademark Office*